(12) United States Patent
Liu et al.

(10) Patent No.: US 11,593,306 B1
(45) Date of Patent: Feb. 28, 2023

(54) FILE DEFRAGMENTATION SERVICE

(71) Applicant: Snowflake Inc., Bozeman, MT (US)

(72) Inventors: Harry Liu, New York, NY (US); Ryan Michael Thomas Shelly, San Francisco, CA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/587,852

(22) Filed: Jan. 28, 2022

Related U.S. Application Data

(60) Provisional application No. 63/263,320, filed on Oct. 29, 2021.

(51) Int. Cl.
| | | |
|---|---|---|
| *G06F 16/17* | (2019.01) | |
| *G06F 16/22* | (2019.01) | |
| *G06F 16/11* | (2019.01) | |
| *G06F 11/34* | (2006.01) | |

(52) U.S. Cl.
CPC ...... *G06F 16/1724* (2019.01); *G06F 11/3409* (2013.01); *G06F 16/125* (2019.01); *G06F 16/2282* (2019.01)

(58) Field of Classification Search
CPC .... G06F 16/1724; G06F 16/125; G06F 16/21; G06F 16/217; G06F 16/2282; G06F 16/278; G06F 11/3409
See application file for complete search history.

(56) References Cited

U.S. PATENT DOCUMENTS

| | | | |
|---|---|---|---|
| 8,959,048 B1 * | 2/2015 | Rossberg | G06F 16/2365 707/769 |
| 8,966,207 B1 | 2/2015 | Bushman | |
| 9,753,935 B1 * | 9/2017 | Tobin | G06F 16/248 |
| 9,805,043 B2 | 10/2017 | Okino | |
| 10,108,690 B1 * | 10/2018 | Murray | G06F 16/278 |
| 11,106,734 B1 * | 8/2021 | Batsakis | G06F 3/0652 |
| 11,256,719 B1 * | 2/2022 | Saxena | G06F 16/278 |
| 2005/0187917 A1 | 8/2005 | Lawande et al. | |
| 2007/0130110 A1 | 6/2007 | Graefe et al. | |

(Continued)

FOREIGN PATENT DOCUMENTS

| | | | | |
|---|---|---|---|---|
| CN | 110727685 A | * | 1/2020 | G06F 16/22 |
| CN | 112328592 A | * | 2/2021 | |

OTHER PUBLICATIONS

"U.S. Appl. No. 17/514,084, Final Office Action dated May 17, 2022", 14 pgs.

(Continued)

*Primary Examiner* — James E Richardson
(74) *Attorney, Agent, or Firm* — Schwegman Lundberg & Woessner, P.A.

(57) ABSTRACT

The subject technology selects a most recently created file from a set of files stored in a source table. The subject technology iterates, in the source table, starting from the most recently created file up to an age threshold to select a first set of files for performing a first defragmentation process. The subject technology sets an indication corresponding to a particular file that is a last file, from the first set of files, that meets the age threshold. The subject technology performs the first defragmentation process on the selected first set of files. The subject technology determines that the first defragmentation process was successful.

30 Claims, 7 Drawing Sheets

(56) References Cited

U.S. PATENT DOCUMENTS

| | | | |
|---|---|---|---|
| 2009/0012980 | A1 | 1/2009 | Stefani et al. |
| 2009/0089334 | A1* | 4/2009 | Mohamed ............ G06F 16/2282 |
| 2009/0292714 | A1 | 11/2009 | Han et al. |
| 2012/0173515 | A1 | 7/2012 | Jeong et al. |
| 2015/0248462 | A1 | 9/2015 | Theeten et al. |
| 2017/0357708 | A1 | 12/2017 | Ramachandran et al. |
| 2018/0150243 | A1 | 5/2018 | Beard |
| 2018/0373435 | A1 | 12/2018 | Hayasaka et al. |
| 2019/0310943 | A1 | 10/2019 | Noll et al. |
| 2020/0133937 | A1* | 4/2020 | Cruanes .................. G06F 16/24 |
| 2020/0142993 | A1 | 5/2020 | Bodziony et al. |
| 2021/0216517 | A1 | 7/2021 | Graefe |

OTHER PUBLICATIONS

"U.S. Appl. No. 17/514,084, Response filed Apr. 29, 2022 to Non Final Office Action dated Jan. 31, 2022", 14 pgs.

"U.S. Appl. No. 17/514,084, Non-Final Office Action dated Jan. 31, 2022", 13 pgs.

"U.S. Appl. No. 17/514,084, Notice of Allowance dated Sep. 6, 2022", 9 pgs.

"U.S. Appl. No. 17/514,084, Response filed Aug. 17, 2022 to Final Office Action dated May 17, 2022", 16 pgs.

\* cited by examiner

FIG. 5

MMP1
Added: MP1, MP2
MP1-> file info...
MP2 -> file info...

MMP2
Added: MP3
MP3-> file info...

MMP3
Added: MP4
Deleted: MP2
MP4-> file info...

MMP V1

MMP4
Added: MP1, MP3, MP4
MP1-> file info...
MP2-> file info...
MP4-> file info...

MMP5
Added: MP5
Deleted: MP1
MP5-> file info...

MMP V3

FILE DEFRAGMENTATION SERVICE

CROSS-REFERENCE TO RELATED APPLICATIONS

This application claims priority to U.S. Provisional Patent Application Ser. No. 63/263,320, filed Oct. 29, 2021, entitled "FILE DEFRAGMENTATION SERVICE," and the contents of which are incorporated herein by reference in its entirety for all purposes.

TECHNICAL FIELD

Embodiments of the disclosure relate generally to databases and, more specifically, to resource management related to performing tasks in conjunction with such databases.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Databases are widely used for data storage and access in computing applications. A goal of database storage is to provide enormous sums of information in an organized manner so that it can be accessed, managed, and updated.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

When certain information is to be extracted from a database, a query statement may be executed against the database data. A network-based database system processes the query and returns certain data according to one or more query predicates that indicate what information should be returned by the query. The database system extracts specific data from the database and formats that data into a readable form.

Queries can be executed against database data to find certain data within the database. A database query extracts data from the database and formats it into a readable form. For example, when a user wants data from a database, the user may write a query in a query language supported by the database. The query may request specific information from the database. The query may request any pertinent information that is stored within the database. If the appropriate data can be found to respond to the query, the database has the potential to reveal complex trends and activities.

BRIEF DESCRIPTION OF THE DRAWINGS

The present disclosure will be understood more fully from the detailed description given below and from the accompanying drawings of various embodiments of the disclosure.

FIG. 5 is a block diagram illustrating consolidation of the metadata micro-partitions shown in FIG. 4, in accordance with some embodiments of the present disclosure.

DETAILED DESCRIPTION

Figure 1:
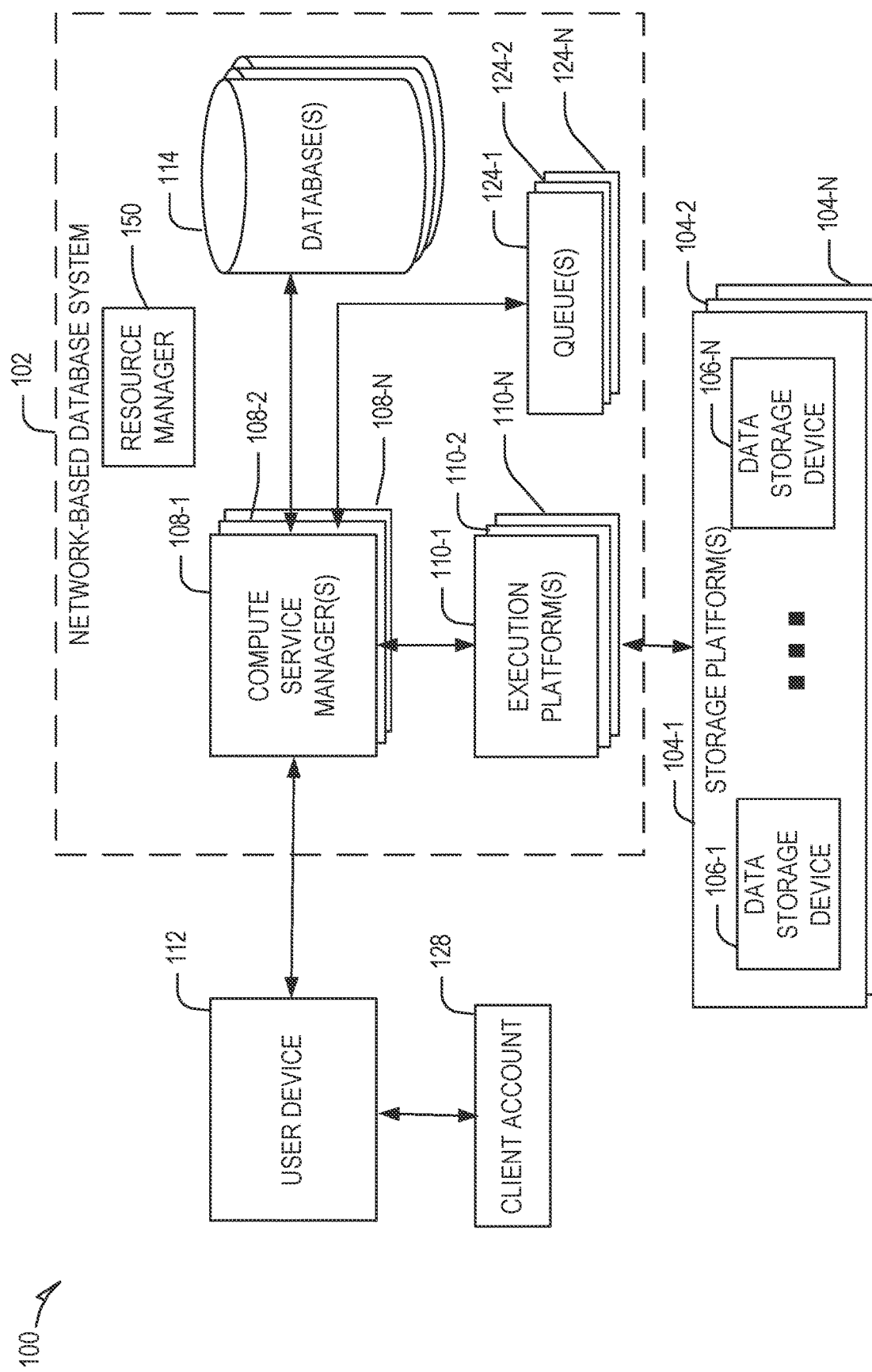
FIG. 1 illustrates an example computing environment that includes a network-based database system in communication with a storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

In light of the foregoing, embodiments of the subject technology provide improvements related to consolidation and defragmentation of data in source tables of a database.

The systems, methods, and devices described herein provide embodiments for scheduling and executing tasks on shared storage and execution platforms. The systems, methods, and devices described herein may be implemented on network-based database platforms. Further, the implementations described herein enable queries to be executed on behalf of a client account.

FIG. 1 illustrates an example computing environment 100 that includes a network-based database system 102 in communication with a storage platform 104-1, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

In some embodiments, the network-based database system 102 includes compute service manager 108-1 to compute service manager 108-N, each of which can be in communication with one or more of queue 124-1 to queue 124-N, a client account 128, database(s) 114, and execution platform 110-1 to execution platform 110-N. In embodiments, each execution platform can correspond to a given (or different) cloud service provider (e.g., AWS®, Google Cloud Platform®, Microsoft Azure®, and the like).

In an embodiment, a compute service manager (e.g., any of the compute service managers shown in FIG. 1) does not receive any direct communications from a client account 128 and only receives communications concerning jobs from the queue. In particular implementations, a compute service manager can support any number of client accounts 128 such as end users corresponding to respective one or more of user device 112 that provide data storage and retrieval requests, system administrators managing the systems and methods described herein, and other components/devices that interact with the compute service manager. As used herein, a compute service manager may also be referred to as a "global services system" that performs various functions as discussed herein, and each of compute service manager 108-1 to compute service manager 108-N can correspond to a particular cluster (or clusters) of computing resources as described further herein.

Thus it is appreciated that embodiments of the subject technology can provide multiple instances of the aforementioned components, where each instance of a compute service manager can also utilize different instances of an execution platform, database, or queue. In particular, it is appreciated that the network-based database system 102 provides different instances of components to enable different versions of databases or execution platforms to be utilized by a given compute service manager, ensuring further flexibility to perform operations in connection with executing queries (e.g., received from client account 128 associated with user device 112). For example, a particular query can be compatible with a particular version of a database or execution platform, and it can be imperative that a given compute service manager facilitate execution of such a query to that particular of the database or execution platform as provided by the network-based database system 102.

As shown, the computing environment 100 comprises the network-based database system 102 and a storage platform 104 (e.g., AWS®, Microsoft Azure Blob Storage®, or Google Cloud Storage®). The network-based database system 102 is used for accessing and/or processing integrated data from one or more disparate sources including data storage devices 106-1 to 106-N within the storage platform 104. The storage platform 104 comprises a plurality of computing machines and provides on-demand computer system resources such as data storage and computing power to the network-based database system 102.

The network-based database system 102 includes one or more compute service managers, execution platforms, and databases. The network-based database system 102 hosts and provides database services to multiple client accounts. Administrative users can create and manage identities (e.g., users, roles, and groups) and use permissions to allow or deny access to the identities to resources and services.

Each compute service manager (e.g., any of the compute service managers shown in FIG. 1) coordinates and manages operations of the network-based database system 102. The compute service manager also performs query optimization and compilation as well as managing clusters of computing services that provide compute resources (also referred to as "virtual warehouses"). The compute service manager can support any number of client accounts such as end users providing data storage and retrieval requests, system administrators managing the systems and methods described herein, and other components/devices that interact with compute service manager 108-1.

The compute service manager (e.g., any of the compute service managers shown in FIG. 1) is also in communication with a user device 112. The user device 112 corresponds to a user of one of the multiple client accounts supported by the network-based database system 102. As shown, the user is associated with a client account 128. In some embodiments, the compute service manager 108-1 does not receive any direct communications from the user device 112 and only receives communications concerning jobs from a queue 124-1 within the network-based database system 102.

The compute service manager is also coupled to one or more database 114, which is associated with the data stored the computing environment 100. The database 114 stores data pertaining to various functions and aspects associated with the network-based database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

In embodiments, the compute service manager is also coupled to one or more metadata databases that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager scans the table to find the information requested by the query. The table may include millions and millions of rows, and it would be very time consuming and it would require significant computing resources for the compute service manager to scan the entire table. The micro-partition organization along with the systems, methods, and devices for database metadata storage of the subject technology provide significant benefits by at least shortening the query response time and reducing the amount of computing resources that are required for responding to the query.

The compute service manager may find the cells of database data by scanning database metadata. The multiple level database metadata of the subject technology enables the compute service manager to quickly and efficiently find the correct data to respond to the query. The compute service manager may find the correct table by scanning table metadata across all the multiple tables in a given database. The compute service manager may find a correct grouping of micro-partitions by scanning multiple grouping expression properties across the identified table. Such grouping expression properties include information about database data stored in each of the micro-partitions within the grouping.

The compute service manager may find a correct micro-partition by scanning multiple micro-partition expression properties within the identified grouping of micro-partitions. The compute service manager may find a correct column by scanning one or more column expression properties within the identified micro-partition. The compute service manager may find the correct row(s) by scanning the identified column within the identified micro-partition. The compute service manager may scan the grouping expression properties to find groupings that have data based on the query. The compute service manager reads the micro-partition expression properties for that grouping to find one or more individual micro-partitions based on the query. The compute service manager reads column expression properties within each of the identified individual micro-partitions. The compute service manager scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

In some embodiments, the compute service manager may determine that a job should be performed based on data from the database 114. In such embodiments, the compute service manager may scan the data and determine that a job should be performed to improve data organization or database performance. For example, the compute service manager may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager may determine that a job should be performed. In some embodiments, the compute service manager determines that a job should be performed based on a trigger event and stores the job in a queue until the compute service manager is ready to schedule and manage the execution of the job. In an embodiment of the disclosure, the compute service manager determines whether a table or pruning index needs to be reclustered based on one or more DML commands being performed, wherein one or more of DML commands constitute the trigger event.

The compute service manager may receive rules or parameters from the client account 128 and such rules or parameters may guide the compute service manager in scheduling and managing internal jobs. The client account 128 may indicate that internal jobs should only be executed at certain times or should only utilize a set maximum amount of processing resources. The client account 128 may further indicate one or more trigger events that should prompt the compute service manager to determine that a job should be performed. The client account 128 may provide parameters concerning how many times a task may be re-executed and/or when the task should be re-executed.

The compute service manager is in communication with one or more queue 124-1. In an embodiment, the compute service manager does not receive any direct communications from a client account 128 and only receives communications concerning jobs from the queue 124-1. In particular implementations, the compute service manager can support any number of client accounts 128 such as end users providing data storage and retrieval requests, system administrators managing the systems and methods described herein, and other components/devices that interact with the compute service manager.

The queue 124-1 may provide a job to the compute service manager. One or more jobs may be stored in the queue 124-1 in an order of receipt and/or an order of priority, and each of those one or more jobs may be communicated to the compute service manager to be scheduled and executed.

In an implementation, the queue 124-1 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth.

The queue 124-1 may determine internal jobs that should be performed to improve the performance of the database and/or to improve the organization of database data. In an embodiment, the queue 124-1 does not store queries to be executed for a client account but instead only stores database jobs that improve database performance.

A compute service manager is further coupled to an execution platform (e.g., one of execution platform 110-1, execution platform 110-2, execution platform 110-N), which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 106-1 to 106-N, and each other storage platform can also include multiple data storage devices. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3TM storage systems or any other data storage technology. Additionally, the storage platform 104 may include distributed file systems (such as Hadoop Distributed File Systems (HDFS)), object storage systems, and the like. Similarly, any of the data storage devices in other storage platforms can also have similar characteristics described above in connection with storage platform 104-1.

The execution platform (e.g., any of the execution platforms shown in FIG. 1) comprises a plurality of compute nodes. A set of processes on a compute node executes a query plan compiled by the compute service manager. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108-1; a fourth process to establish communication with the compute service manager 108-1 after a system boot; and a fifth process to handle all communication with a compute cluster for a given job provided by the compute service manager 108-1 and to communicate information back to the compute service manager 108-1 and other compute nodes of the execution platform.

A relational join is a data processing operation in a relational data management system. For example, a join is a binary operator, taking two relations R and S, and a binary predicate θ as inputs, and producing a single relation which contains the set of all combinations of tuples in R and S which satisfy the predicate θ.

In an example, a single query can performs multiple join operations (among other types of operations), and a tree-shaped (or tree structure) execution plan (e.g., a query plan) can be generated to represent the query where such a query plan includes a set of nodes corresponding to various operations that are performed during query execution. For illustration, join operations can form intermediate nodes and group nodes of the tree structure representing the query plan, while base relations form analogous leaves of that tree structure of the query plan. Data flows from the leaves of the tree structure towards the root, where the final query result is produced.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110-1. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Each of compute service manager, database, execution platform, and storage platform shown in FIG. 1 may be implemented as a distributed system (e.g., distributed across multiple systems/platforms at multiple geographic locations). Additionally, each of the compute service manager, database, execution platform, and storage platform can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by a compute service manager. These jobs are scheduled and managed by the compute service manager to determine when and how to execute the job. For example, the compute service manager may divide the job into multiple discrete tasks and may determine what data is needed to execute each of the multiple discrete tasks. The compute service manager may assign each of the multiple discrete tasks to one or more nodes of an execution platform to process the task. The compute service manager 108-1 may determine what data is needed to process a task and further determine which nodes within the execution platform 110-1 are best suited to process the task. Some nodes may have already cached the data needed to process the task and, therefore, be a good candidate for processing the task. Metadata stored in the database 114 assists the compute service manager in determining which nodes in the execution platform have already cached at least a portion of the data needed to process the task. One or more nodes in the execution platform process the task using data cached by the nodes and, if necessary, data retrieved from the storage platform. It is desirable to retrieve as much data as possible from caches within the execution platform because the retrieval speed is typically much faster than retrieving data from the storage platform.

As shown in FIG. 1, the computing environment 100 separates the execution platforms from the storage platforms. In this arrangement, the processing resources and cache resources in the execution platforms operate independently of the data storage devices in the storage platforms. Thus, the computing resources and cache resources are not restricted to specific data storage devices. Instead, all computing resources and all cache resources may retrieve data from, and store data to, any of the data storage resources in the storage platform.

In embodiments, a resource manager 150 can perform load balancing operation in connection with availability zones including different clusters of instances of compute service managers with varying computing resources (e.g., different virtual warehouses, and the like).

Figure 2:
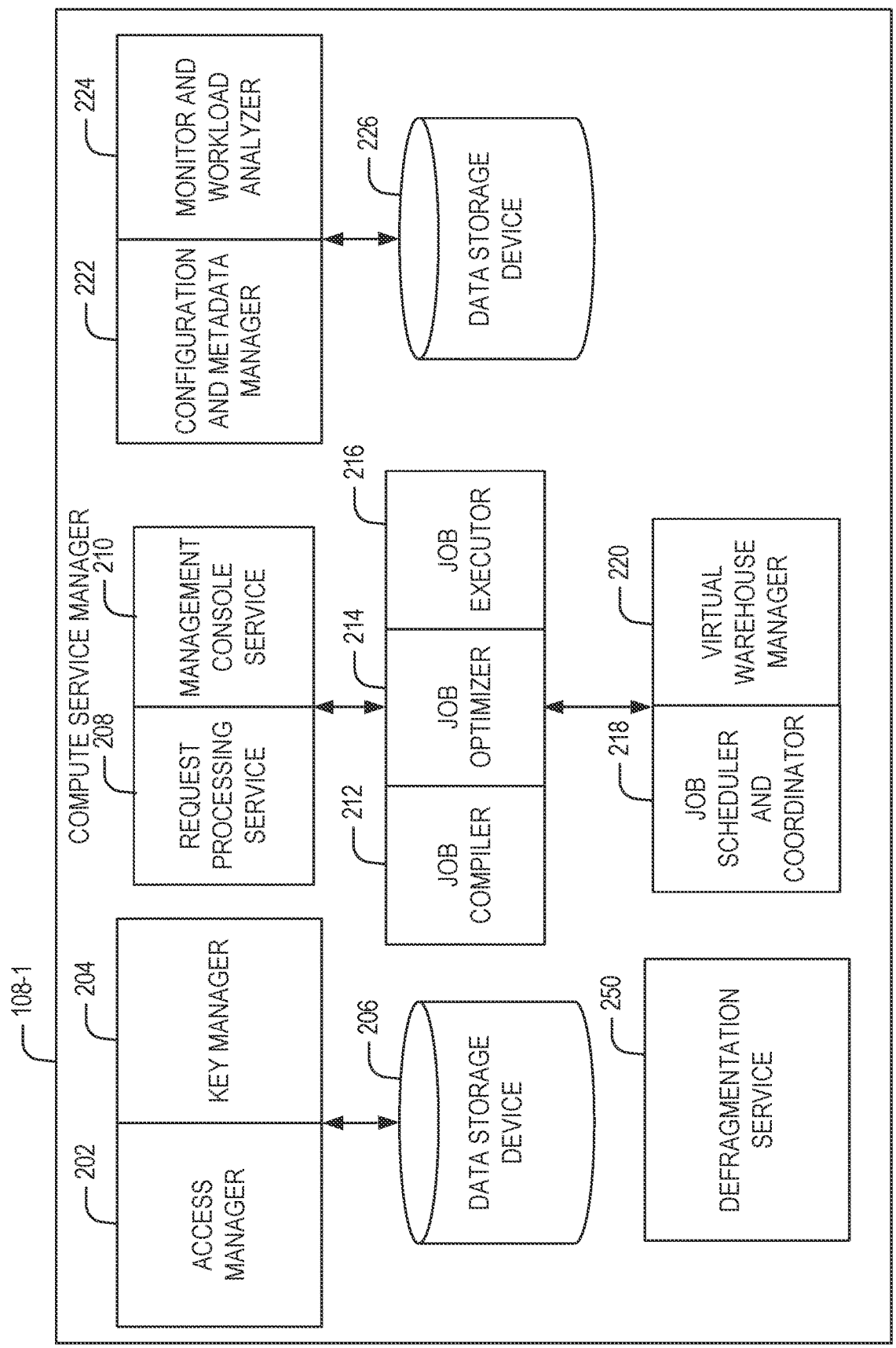
FIG. 2 is a block diagram illustrating components of a compute service manager, in accordance with some embodiments of the present disclosure.

FIG. 2 is a block diagram illustrating components of the compute service manager 108-1, in accordance with some embodiments of the present disclosure. As shown in FIG. 2, the compute service manager 108-1 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104-1). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110-1 or in a data storage device in storage platform 104-1.

A management console service 210 supports access to various systems and processes by administrators and other system managers. Additionally, the management console service 210 may receive a request to execute a job and monitor the workload on the system.

The compute service manager 108-1 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108-1.

A job scheduler and coordinator 218 sends received jobs to the appropriate services or systems for compilation, optimization, and dispatch to the execution platform 110-1. For example, jobs may be prioritized and processed in that prioritized order. In an embodiment, the job scheduler and coordinator 218 determines a priority for internal jobs that are scheduled by the compute service manager 108-1 with other "outside" jobs such as user queries that may be scheduled by other systems in the database but may utilize the same processing resources in the execution platform 110-1. In some embodiments, the job scheduler and coordinator 218 identifies or assigns particular nodes in the execution platform 110-1 to process particular tasks. A virtual warehouse manager 220 manages the operation of multiple virtual warehouses implemented in the execution platform 110-1. As discussed below, each virtual warehouse includes multiple execution nodes that each include a cache and a processor.

Additionally, the compute service manager 108-1 includes a configuration and metadata manager 222, which manages the information related to the data stored in the remote data storage devices and in the local caches (e.g., the caches in execution platform 110-1). The configuration and metadata manager 222 uses the metadata to determine which data micro-partitions need to be accessed to retrieve data for processing a particular task or job. A monitor and workload analyzer 224 oversee processes performed by the compute service manager 108-1 and manages the distribution of tasks (e.g., workload) across the virtual warehouses and execution nodes in the execution platform 110-1. The monitor and workload analyzer 224 also redistribute tasks, as needed, based on changing workloads throughout the network-based database system 102 and may further redistribute tasks based on a user (e.g., "external") query workload that may also be processed by the execution platform 110-1. The configuration and metadata manager 222 and the monitor and workload analyzer 224 are coupled to a data storage device 226. Data storage device 226 in FIG. 2 represent any data storage device within the network-based database system 102. For example, data storage device 226 may represent caches in execution platform 110-1, storage devices in storage platform 104-1, or any other storage device.

In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform (e.g., at least one storage platform from storage platforms 104-1 to 104-N). In embodiments herein, each file includes data, which can be further compressed (e.g., using an appropriate data compression algorithm or technique) to reduce a respective size of such a file. For example, as discussed further herein, due to fragmentation, some data corresponding to a set of rows in a given file may be empty or sparsely populated, and compression of such rows can yield a smaller size of the file.

In some instances, fragmentation can occur at a table level where data (e.g., corresponding to a set of rows in a given source table) are stored across different micro-partitions or files associated with a given table. In comparison, when there is no fragmentation (or a low amount of fragmentation), the same set of rows are stored in a same partition or file associated with the table. It is appreciated that even in a source table with low fragmentation (e.g., based on a threshold number of rows), there can be multiple files associated with the table. Consolidated rows may also not be stored in one file, and can be stored in fewer files than where such rows were stored prior to consolidation. In an example, a fragmented file includes fewer rows than a "fully-sized" file (e.g., based on a threshold number of rows, and the like). In an implementation, ten percent (10%) under a full size file for a given table is a threshold amount that indicates whether a file is fragmented where a full file size can be from a size range from 16 MB (megabytes) to 64 MB. It is appreciated however that such threshold amounts and file sizes can vary and be any other appropriate amount or file size depending on the subject system implementation. In regard to dealing with fragmentation, the subject technology improves performance by reducing an overhead with managing and storing metadata associated with such data in the set of rows and also reducing overhead during query execution, each of which can be accomplished by combining data that is stored in different files or micro-partition into the same file or partition.

In other examples, over time, modifying data can cause data fragmentation where files (or micro-partitions) are undersized or sparsely populated. As mentioned herein, each partition can correspond to a set of rows in a given source table, and a fragmented partition refers to a particular partition with one or more rows that are empty such that the source table is not as populated with data.

In an example, determining whether a partition (or file) is fragmented can be based on a threshold percentage or value. The number of empty rows over a threshold number of rows or percentage of rows can determine that the partition (or file) is fragmented. Additionally, a target size can be utilized in which if a number of partitions or files in a given table is under this target size, then such a table can be considered fragmented.

In some embodiments, metadata may be generated when changes are made to one or more source table(s) using a data manipulation language (DML), where such changes can be made by way of a DML statement. Examples of modifying data, using a given DML statement, may include updating, changing, merging, inserting, and deleting data into a source table(s), file(s), or micro-partition(s). Also, when multiple tables are selected from (e.g., as part of a DML statement) into another table, the target table of such a DML statement could suffer from fragmentation. It is also understood that, in some examples, there does not necessarily have to be other tables involved for a target table to become fragmented.

Embodiments of the subject technology perform consolidation and defragmentation of files in a given source table as discussed further herein. Advantageously, such embodiments provide improvements to the generation and management of the aforementioned metadata, which can consume extraneous computing resources for the subject system when or if not efficiently managed (e.g., when fragmentation of files occurs and the subject system has to process additional metadata as a result).

As further illustrated, compute service manager 108-1 includes a defragmentation service 250. In embodiments, defragmentation service 250 performs consolidation and defragmentation of files.

In embodiments, the subject technology enables consolidating small files into larger files, and reducing the total number of files in a source table where a large number of files can lead to various issues in the system and in compilation of queries. In an implementation, such files may correspond to files stored in a distributed database (e.g., FoundationDB, and the like).

In comparison, some existing solutions perform consolidation and defragmentation techniques (e.g., as a foreground process during query execution) which has example disadvantages including impacting insert performance (e.g., when performing an insert operation into a given table) due to an increased workload as part of executing a given query and also, in an effort to reduce such a performance impact, selecting far fewer files for each round of a given foreground insert operation. In an example, another disadvantage includes that during defragmentation of files in the foreground of an insert operation, file locks are taken as part of the insert operation whereas otherwise file locks would not be taken, which could affect a concurrency level of insert operations. Consequently, such existing solutions may also not guarantee defragmentation of all small files and, depending on the DML pattern, a large number of partitions may not be defragmented.

Although the above discussion and examples are related to compute service manager 108-1, in some embodiments, similar or the same components are included in each of the compute service managers shown in FIG. 1.

Figure 3:
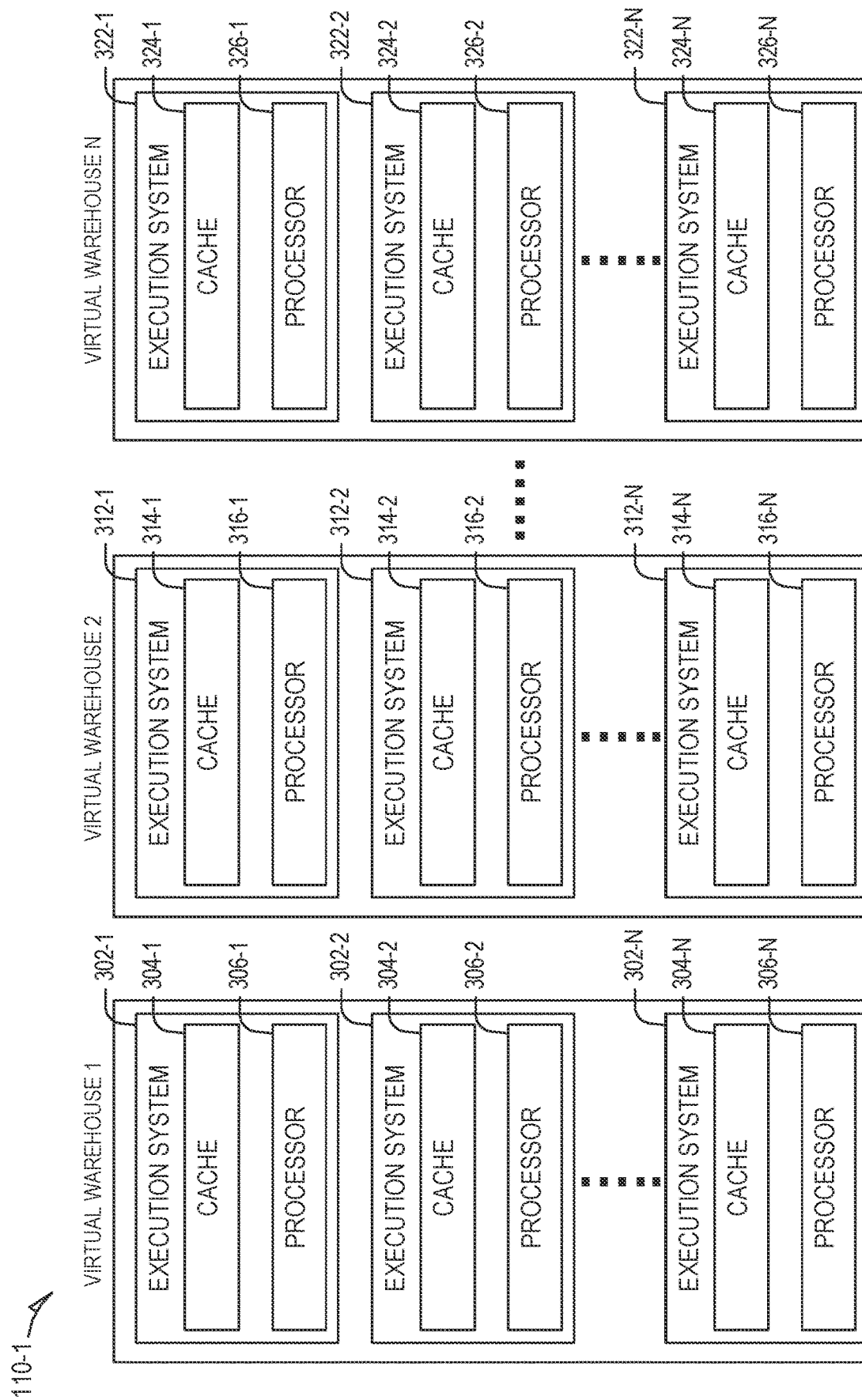
FIG. 3 is a block diagram illustrating components of an execution platform, in accordance with some embodiments of the present disclosure.

FIG. 3 is a block diagram illustrating components of the execution platform 110-1, in accordance with some embodiments of the present disclosure. As shown in FIG. 3, the execution platform 110-1 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110-1 can add new virtual warehouses and drop existing virtual warehouses in real-time based on the current processing needs of the systems and users. This flexibility allows the execution platform 110-1 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-$n$. Execution node 312-1 includes a cache 314-1 and a processor 316-1. Execution node 312-2 includes a cache 314-2 and a processor 316-2. Execution node 312-$n$ includes a cache 314-$n$ and a processor 316-$n$. Additionally, virtual warehouse 3 includes three execution nodes 322-1, 322-2, and 322-$n$. Execution node 322-1 includes a cache 324-1 and a processor 326-1. Execution node 322-2 includes a cache 324-2 and a processor 326-2. Execution node 322-$n$ includes a cache 324-$n$ and a processor 326-$n$.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110-1, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110-1 is also fault tolerant. For example, if one virtual warehouse fails, that virtual warehouse is quickly replaced with a different virtual warehouse at a different geographic location.

A particular execution platform 110-1 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although the above discussion and examples are related to execution platform 110-1, in some embodiments, similar or the same components are included in each of the execution platforms shown in FIG. 1.

Figure 4:
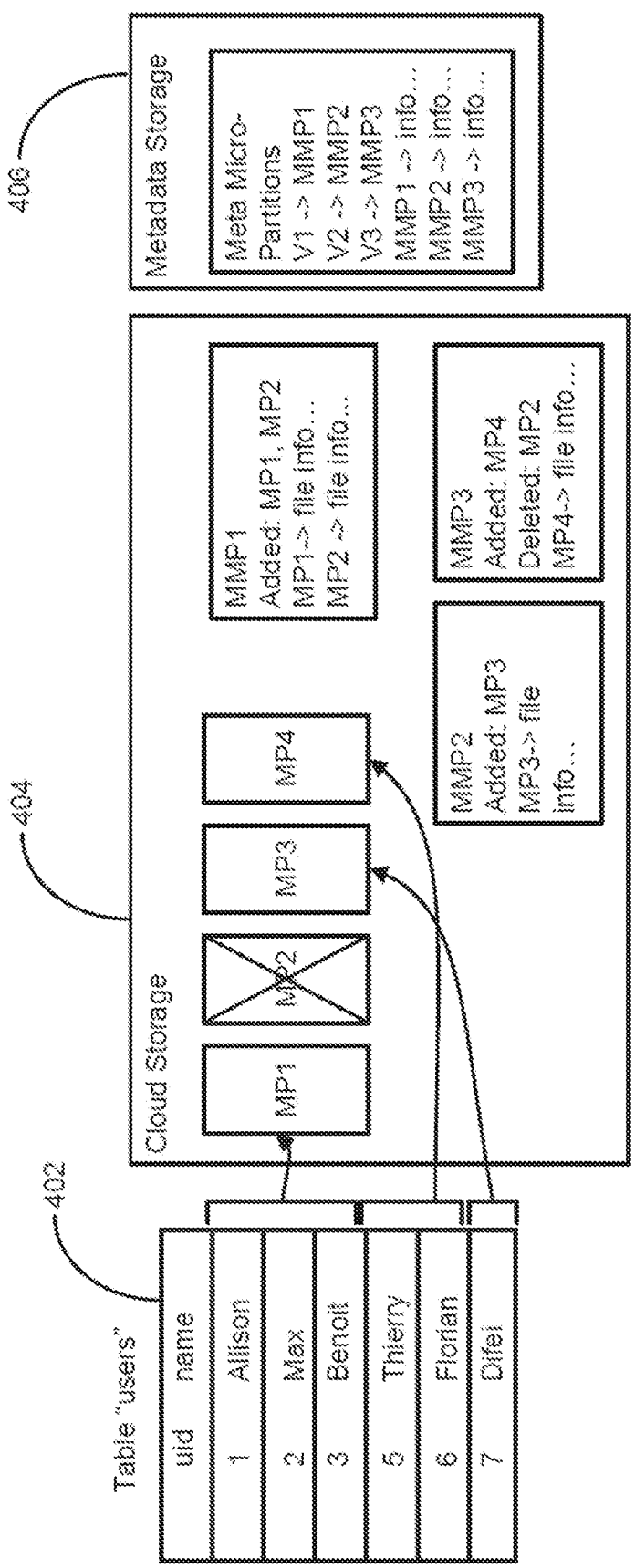
FIG. 4 illustrates a table and metadata after adding a record and deleting a record, in accordance with some embodiments of the present disclosure.

FIG. 4 illustrates a table and metadata after adding a record (7, "Difei") and deleting a record (4, "Neda") in table 402. In this example, table 402 is a "users" table stored in multiple micro-partitions in cloud storage 404. The table 402 includes a "uid" column and a "name" column. In particular, micro-partition MP1 includes the table data for the first three rows (i.e., uids 1, 2, and 3 and names Allison, Max, and Benoit).

Micro-partition metadata is stored within metadata storage 406. The micro-partition metadata contains table versions and information about each table data micro-partition. The metadata storage 406 may include mutable storage (storage that can be overwritten or written in-place), such as a local micro-partition system, system, memory, and the like. The metadata storage 406 may further include immutable storage that cannot be updated in-place.

In one embodiment, the micro-partition metadata consists of two data sets: table versions and micro-partition information. The table versions data set includes a mapping of table versions to lists of added micro-partitions and removed micro-partitions. Micro-partition information consists of information about each micro-partition, including micro-partition path, micro-partition size, micro-partition key id, and summaries of all rows and columns that are stored in the micro-partition, for example.

Each modification of the table creates new micro-partitions and new micro-partition metadata. Inserts into the table create new micro-partitions. Deletes from the table remove micro-partitions and potentially add new micro-partitions with the remaining rows in a table if not all rows in a micro-partition were deleted. Updates remove micro-partitions and replace them with new micro-partitions with rows containing the updated records.

As mentioned before, the table 402 includes a "uid" column and a "name" column. In particular, micro-partition MP1 includes the table data for the first three rows (i.e., uids 1, 2, and 3 and names Allison, Max, and Benoit). Although not shown in FIG. 4, micro-partition MP2 (which is now indicated as deleted in FIG. 4) previously included table data for three rows (uids 4, 5, and 6, and names Neda, Thierry, and Florian).

By way of example, when inserting the record (7, "Difei") into table 402, the database system creates a new micro-partition MP3 in the cloud storage 404 that contains this record. Furthermore, the micro-partition metadata in the metadata storage 406 has been updated to include a new table version V2 and information about MP3. Table version V2 (e.g., MMP2) records that micro-partition MP3 was added. In an example, micro-partition information includes the micro-partition path, account, created timestamp, micro-partition size, and summaries of all rows and columns that are stored in micro-partition MP3.

In the example of FIG. 4, a first modification (insert uid "7" and name "Difei") stores micro-partition MP3 and metadata micro-partition MMP2 in the cloud. MMP2 lists added micro-partition MP3, including all micro-partition information about MP3. The metadata storage 406 is updated with table version V2, which maps to MMP2, and information about MMP2. In another example, one table version could map to multiple new MMPs.

A second modification (delete uid "4" and name "Neda") stores micro-partition MP4 and metadata micro-partition MMP3 in the cloud storage 404. MMP3 lists added table data micro-partition MP4, including all micro-partition information of MP4, and also lists deleted table data micro-partitions of MP2. As mentioned before, micro-partition MP2 (which is indicated as deleted in FIG. 4) previously included table data for three rows (uids 4, 5, and 6, and names Neda, Thierry, and Florian).

The storage of the metadata micro-partitions MMP1, MMP2, and MMP3 in cloud storage 404 or immutable storage allows for increased metadata storage capacity. For example, all metadata about the table data micro-partitions MP1, MP2, MP3, and MP4 is found within the cloud storage 404 in the metadata micro-partitions MMP1, MMP2, and MMP3. Metadata about the metadata micro-partitions MMP1 (information about the metadata), which is much smaller in size, is stored in a key-value store, mutable storage, and/or local storage.

In one embodiment, a database system computes a scan set of micro-partitions that must be read to answer a query. The scan set is computed using table versions. Given a set of table versions, the database system reads information about the corresponding metadata micro-partitions from the metadata store. It then downloads the metadata micro-partitions from the cloud and reads the list of added and deleted micro-partitions. Using these lists, it computes the scan set. Using micro-partition information stored in metadata micro-partitions (e.g. information about rows and columns), the scan set may be pruned such that only relevant portions of the scan set are scanned to respond to the query.

For example, when selecting data from table "users" 402 at the time illustrated in FIG. 4, the scan set is computed using table versions V1, V2, and V3. The warehouse reads information about corresponding metadata micro-partitions MMP1, MMP2, and MMP3. It downloads these metadata micro-partitions from the cloud. The micro-partitions may be downloaded in parallel. In one embodiment, a resource manager can begin reading one of the micro-partitions even if the others have not yet completely downloaded. From the aggregated list of added micro-partitions MP1, MP2, MP3, and MP4, it removes deleted micro-partition MP2. The resulting scan set would therefore be MP1, MP3, and MP4. These micro-partitions (or sub-portions of them) may be retrieved by an execution node for executing the query.

In one embodiment, metadata micro-partitions are periodically consolidated in the background. Consolidation, or "compaction," of metadata micro-partitions aggregates all added micro-partitions of all metadata micro-partitions and removes all deleted micro-partitions from that list. Consolidation creates one or more compacted metadata micro-partitions that contain only the resulting added-micro-partitions list, including all micro-partition information of these micro-partitions. The purpose of consolidation is two-fold. First, many metadata micro-partitions are compacted into a much smaller set of metadata micro-partitions for faster downloading and reading. Second, micro-partitions that are not referenced anymore in the compacted metadata micro-partitions can be removed from the cloud once the old metadata micro-partitions are removed.

Metadata micro-partition versions distinguish different sets of metadata micro-partitions. The compacted micro-partitions in one metadata micro-partition version are a consolidation of all metadata micro-partitions of the previous metadata micro-partition version. New metadata micro-partitions are always registered under the latest metadata micro-partition version. Old metadata micro-partitions may be deleted from cloud storage after they have been consolidated. All micro-partitions that are not referenced in compacted micro-partitions may be deleted once they are not referenced in any metadata micro-partition anymore.

FIG. 5 is a block diagram illustrating consolidation of the metadata micro-partitions shown in FIG. 4. Specifically, metadata micro-partitions MMP1, MMP2, and MMP3 are shown consolidated into compacted metadata micro-partition MMP4. Metadata micro-partition MMP4 only contains added micro-partitions MP1, MP3, and MP4 because MP2 was deleted in MMP3. MMP4 also contains all micro-partition information of MP1, MP3, and MP4. In one embodiment, metadata micro-partition version three (MMP V3) is created and MMP4 is registered under MMP V3. A new metadata micro-partition MMP5 is registered under the latest metadata micro-partition version MMP V3. MMP5 corresponds to table version V4 (not shown in FIG. 4). Table version V3 may point to either MMP1, MMP2, and MMP3 of MMP V1 or to MMP4 of MMP V3, as they will result in the exact same scan set. As is illustrated, creation of the consolidated metadata micro-partition MMP4 allows for one micro-partition to do what previously took three micro-partitions. In one embodiment, an indication of a metadata micro-partition version may be stored after completing consolidation so that a version before the consolidation may still be determined or accessed. All subsequent table data changes may be reflected based on MMP4 or later. Thus, MMP1, MMP2, and MMP3 may be deleted, if desired or if they represent versions which no longer need to be maintained (e.g., for purposes of a "time travel" feature).

In one embodiment, consolidation of metadata micro-partitions happens in the background process in the database system without any impact on the user workload. New metadata micro-partitions may be added while compacted micro-partitions are computed. Only when the compacted micro-partition has been uploaded to the cloud may it be used to compute that scan set.

Various performance improvements may be achieved with the immutable storage of metadata. In one embodiment, metadata micro-partitions are prefetched. For example, when downloading a set of metadata micro-partitions, the database system downloads the metadata micro-partitions in parallel in the background before the metadata micro-partitions are opened by the process. Pre-fetching improves reading time of metadata micro-partitions because when the process wants to open a metadata micro-partition it may have already been downloaded using pre-fetching.

In one embodiment, metadata micro-partitions are cached. Metadata micro-partitions may be cached on the local micro-partition system of a process. Metadata micro-partitions may only be downloaded once, even if they are read by many different processes that share the same micro-partition system. Old cached metadata micro-partitions may be deleted from the cache if the cache grows out of space. In this case, the metadata micro-partitions may be downloaded again as needed.

In one embodiment, metadata micro-partitions have a columnar layout. Micro-partition information within metadata micro-partitions is stored with a columnar layout. This means the format of the metadata micro-partition is not row-by-row, but column-by-column. If a process reads information about a column in a metadata micro-partition, it only needs to read a single, contiguous block of bytes. In one embodiment, every block of bytes is compressed using a standard compression algorithm ("gzip"). Both these techniques improve read performance.

In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform (e.g., at least one storage platform from storage platforms 104-1 to 104-N). In embodiments herein, each file includes data, which can be further compressed (e.g., using an appropriate data compression algorithm or technique) to reduce a respective size of such a file. For example, as discussed further herein, due to fragmentation, some data corresponding to a set of rows in a given file may be empty or sparsely populated, and compression of such rows can yield a smaller size of the file.

In some instances, fragmentation can occur at a table level where data (e.g., corresponding to a set of rows in a given source table) are stored across different micro-partitions or files associated with a given table. In comparison, when there is no fragmentation (or a low amount of fragmentation), the same set of rows are stored in a same partition or file associated with the table. It is appreciated that even in a source table with low fragmentation (e.g., based on a threshold number of rows), there can be multiple files associated with the table. Consolidated rows may also not be stored in one file, and can be stored in fewer files than where such rows were stored prior to consolidation. In an example, a fragmented file includes fewer rows than a "fully-sized" file (e.g., based on a threshold number of rows, and the like). In an implementation, ten percent (10%) under a full size file for a given table is a threshold amount that indicates whether a file is fragmented where a full file size can be from a size range from 16 MB (megabytes) to 64 MB (e.g., when compressed). It is appreciated, however, that such threshold amounts and file sizes can vary and be any other appropriate amount or file size depending on the subject system implementation. In regard to dealing with fragmentation, the subject technology improves performance by reducing an overhead with managing and storing metadata associated with such data in the set of rows and also reducing overhead during query execution, each of which can be accomplished by combining data that is stored in different files or micro-partition into the same file or partition.

In other examples, over time, modifying data can cause data fragmentation where files (or micro-partitions) are undersized or sparsely populated. As mentioned herein, each partition can correspond to a set of rows in a given source table, and a fragmented partition refers to a particular partition with one or more rows that are empty such that the source table is not as populated with data.

In an example, determining whether a partition (or file) is fragmented can be based on a threshold percentage or value. The number of empty rows over a threshold number of rows or percentage of rows can determine that the partition (or file) is fragmented. Additionally, a target size can be utilized in which if a number of partitions or files in a given table is under this target size, then such a table can be considered fragmented.

Embodiments of the subject technology consolidate small files into larger files, reducing the total number of files in the table where large numbers of files can lead to various issues in the system and in compilation.

In existing approaches, consolidation of small files are performed as part of insert operations, which can impact the performance of such insert operations because there is an increase in the amount of work being performed as part of the query and also, in an effort to reduce performance, far fewer files are selected for each round of foreground defragmentation for insert operations. As mentioned before, another disadvantage includes that during defragmentation of files in the foreground of an insert operation, file locks are taken as part of the insert operation whereas otherwise file locks would not be taken, which could affect a concurrency level of insert operations.

In an example, the foreground defragmentation approach may not defragment all small files, and depending on a given DML pattern there could be a large number of partitions not defragmented with this approach.

Embodiments of the subject technology advantageously enable defragmentation and consolidation of files during query execution. In particular, the subject technology does not affect performance of foreground queries (e.g., queries currently being executed) and can cleans up small files after such queries have (or while) executed. Moreover, the subject technology does not prevent any DML statements from running on a given source table as optimistic locking (similarly to automatic-clustering) is utilized. In an implementation, the defragmentation service 250 is also able to defragment more files at a time since a small set of files is selected in foreground to reduce an impact on performance (e.g., execution time of the query, and the like).

Another example advantage is that the defragmentation service 250 can intelligently construct batches so as to preserve the natural clustering order of the table and pick batch sizes intentionally to control the length of jobs as discussed further herein.

Further, when performing partition consolidation, the defragmentation service 250 is also aware of a data property with respect to the impact on query performance. In this manner, defragmentation service 250 can avoid potential degradations to performance (e.g., pruning performance) by adaptively selecting target partition sizes to consolidate depending on the size of the table.

In an implementation, defragmentation service 250 executes as a background service. In an example, defragmentation tasks are enqueued/dequeued similar to automatic clustering tasks.

Defragmentation service 250 performs file selection based on a file selection strategy for selecting files to consolidate and with which other files they should be consolidated, as discussed further below.

Some of the main goals of a file selection algorithm, as performed by defragmentation service 250, are to maintain the natural clustering properties of a given source table both at the EP file-level and the clustering of the data and to improve the database system utilization of defragmentation jobs. Thus, defragmentation service 250 helps reduce the churn on the table and its derived objects.

In an implementation, jobs performed by defragmentation service 250 are logical inserts and the file selection is performed as an auxiliary file scan for the insert on the target table. An example strategy for selecting files, performed by defragmentation service 250, is described in the following:

Traverse the list of base files in the table in reverse order (starting with the files that were most recently created) using the 2-level EP cache reverse iterator If defragmentation service 250 determines a file: 1) has a size<the small file size threshold and 2) was created for an indicator of reaching the end of data:

If the file fits into the current batch of files and was created close enough in time to the rest of the files in the batch, the defragmentation service 250 adds the file to the current batch Otherwise if there are more available batches and the current batch is large enough or the creation time difference (e.g., based on a value corresponding to a time gap) between consecutive files is large enough, the defragmentation service 250 cuts the current batch and adds this file to the next one (e.g., next batch)

When defragmentation service 250 has selected the maximum number of batches or reached a base file ID of the file that defragmentation service 250 previously stopped at (e.g., any files with id<base file ID have already been looked at) or the files were created too far back in the past, where such a base file ID can indicate a temporal order of such file(s)

If defragmentation service 250 has filled all the batches that defragmentation service 250 can for this particular job, defragmentation service 250 does not update the base file ID to allow the service to search as far back as possible and to avoid missing any small files Otherwise, defragmentation service 250 updates the value of the base file ID to equal a max file ID (e.g., base file ID=maximum file ID) that is seen during this selection so that defragmentation service 250 knows where to stop in the next time that the defragmentation service 250 performs file selection In embodiments, if defragmentation service 250 starts at the end of the table (e.g., with the most recently created files), the files that were created in close time proximity to each other would have ended up in the same compact EP files and therefore are safe to combine with each other while preserving the natural EP level clustering. Further, even if defragmentation service 250 defragment files that are already in compact EP files, as long as defragmentation service 250 defragments files that were created within a given time range, then defragmentation service 250 is maintaining the natural data-level clustering without negatively impacting the clustering at the EP level.

In an implementation, defragmentation service 250 cuts batches at EP-file boundaries or even stops searching for small files once defragmentation service 250 reaches files that had already been compacted (to reduce churn on the table and its derived objects). However, it is appreciated that as long as defragmentation service 250 defragments files that were created close enough together, stopping at EP-file boundaries can be avoided. In an implementation, defragmentation service 250 can start from the back (and including non-compacted EP files) which will provide the best chance of keeping the data-level clustering of the table intact. Since any particular file will only be defragmented once (e.g., since afterwards the resulting file will be large enough not to be selected again), the additional churn on the table and its derived objects is minimal. In an implementation, defragmentation service 250 looks at the minimum time stamp, if this is not the first round of file defragmentation on a table, to enable defragmentation service 250 to make one pass through the entire table first before narrowing down the search to files created in a recent time window.

In embodiments, file defragmentation tasks are generated from EP compaction tasks, and therefore defragmentation service 250 can consider instances where the compactor falls behind and, in such instances, may need to extend the relative time window of file creation times to look at for a particular round of defragmentation.

In some implementations, a file batch set is generated while defragmentation service 250 iterates over the files, rather than selecting a list of files then using a value for build into equal batches to bin-pack files into equally sized batches. In an example, defragmentation service 250 may sacrifice having equal-sized batches across workers (e.g., execution nodes) in order to ensure that each batch contains only files created within a given time range. To accomplish this, in an implementation, defragmentation service 250 maintains the set of files going into the current batch as well as their cumulative size. When defragmentation service 250 is traversing "backwards", this means that a base file ID of a maximum file ID selected (e.g., base file ID (maximum file ID selected)) can be utilized as a stopping point for the next round of defragmentation rather than a starting point. As a result, defragmentation service 250 will to wait to set the base file ID until a selection job does not saturate all the batches (e.g., selected as much as it can and from now on jobs will be safe to stop at the base file ID knowing that any files before it have already been looked at).

Figure 6:
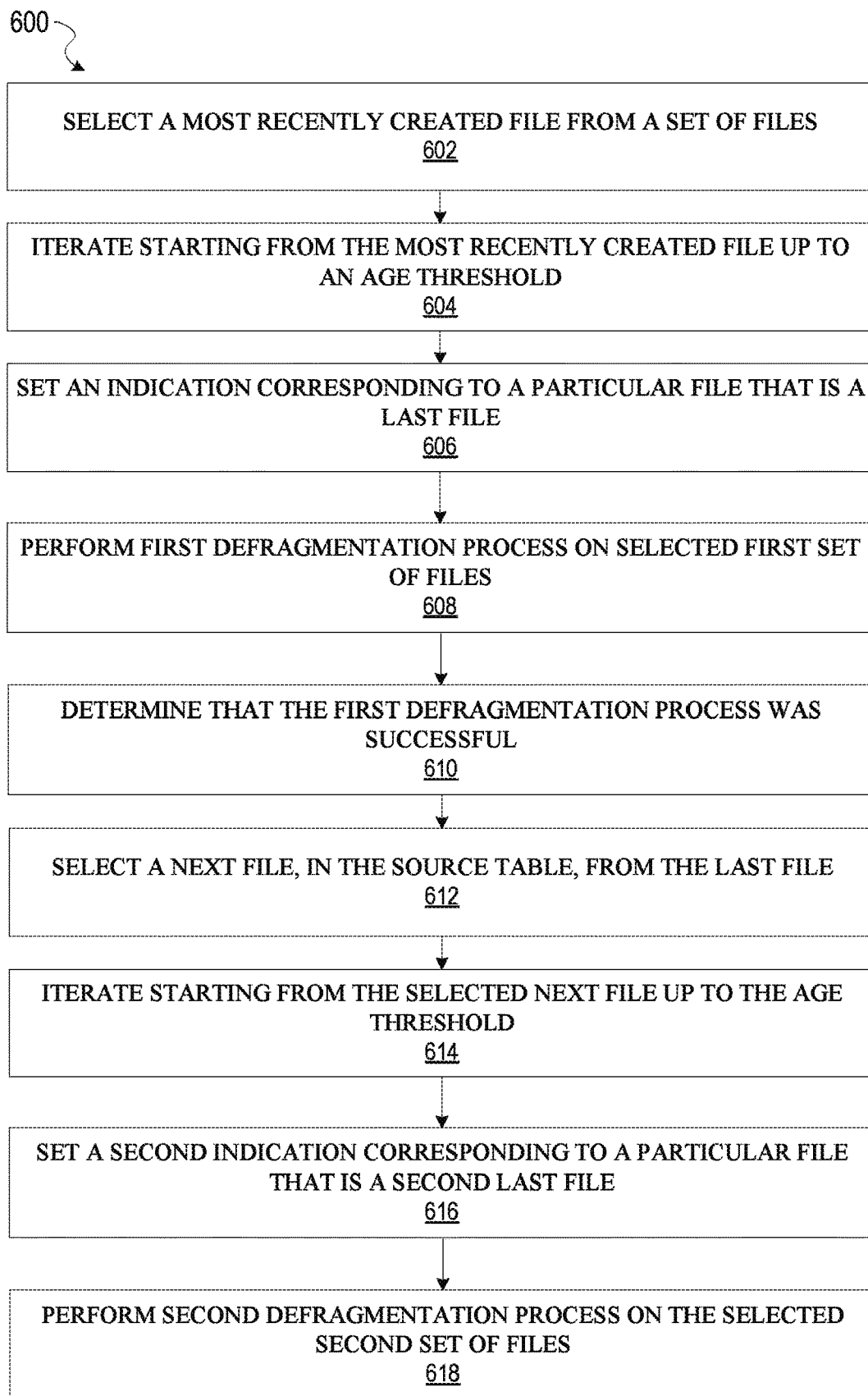
FIG. 6 is a flow diagram illustrating operations of a database system in performing a method, in accordance with some embodiments of the present disclosure.

FIG. 6 is a flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102. Accordingly, the method 600 is described below, by way of example with reference thereto. However, it shall be appreciated that method 600 may be deployed on various other hardware configurations and is not intended to be limited to deployment within the network-based database system 102.

At operation 602, defragmentation service 250 selects a most recently created file from a set of files stored in a source table.

At operation 604, defragmentation service 250 iterates, in the source table, starting from the most recently created file up to an age threshold to select a first set of files for performing a first defragmentation process, the age threshold comprising a period of time that files were created (e.g., files that were created over a span of a week's time starting from the most recently created file to a last file within the span of the week's time) for including in the source table. In an example, each file from the first set of files is a file that is small (e.g., needs to be defragmented) based on a threshold percentage or value that indicates such a small file is fragmented. As discussed before, the number of empty rows over a threshold number of rows or percentage of rows can determine that the file is fragmented.

In embodiments, to select the first set of files for performing the first defragmentation process comprises: defragmentation service 250 determines that a particular file is less than a file size threshold; determining that including a size of the particular file is within a total size threshold of the selected first set of files; and including the particular file in the selected first set of files.

In embodiments, to select the first set of files for performing the first defragmentation process comprises: defragmentation service 250 determines that including the size of the particular file is greater than the total size threshold of the selected first set of files; including the particular file in a subsequent set of files for defragmentation.

Moreover, in some embodiments, the age threshold can be dynamically adjusted from iteration to iteration based on different factors, including, for example, a frequency (or threshold or percentage) of instances where performing a defragmentation process has failed when using the same age threshold. In such instances, the age threshold can be adjusted upward or downward accordingly to help mitigate such failures in the defragmentation process.

In embodiments, the age threshold is determined based on a predetermined period of time prior to a current time, or the age threshold is determined based on an analysis of a number of database operations within a periodic period of time, the periodic period of time comprising a portion of an hour, different portions of an hour, several hours, a day, several days, a week, a month, or a year, or the age threshold is determined based on determining a set of peak periods for database operations and setting the age threshold to cover a particular period of time from the current time to a previous peak period from the current time.

At operation 606, defragmentation service 250 sets an indication corresponding to a particular file that is a last file, from the first set of files, that meets the age threshold. In an example, the last file is an oldest file from the first set of files.

At operation 608, defragmentation service 250 performs the first defragmentation process on the selected first set of files.

In embodiments, the first defragmentation process includes inserting the selected first set of files to a target table. It is appreciated that in some instances a source table and a target table are the same table and that these respective phrases are utilized to distinguish between a table prior to inserting and a table after inserting. In embodiments, files are selected from a given table and re-inserted into the same table in the form of larger or consolidated files.

At operation 610, defragmentation service 250 determines that the first defragmentation process was successful. In an example, this determination can be based on whether any files from the selected first set of files was deleted prior to or during the first defragmentation process.

At operation 612, defragmentation service 250 selects a next file, in the source table, from the last file. In embodiments, when a minimum file (e.g, based on age or going through the entire table) is reached, defragmentation service 250 can scan from the end of the table to a maximum file (e.g., a file that has been processed before). As discussed before, in implementations, a file ID increases monotonically with age (e.g., over the passage of time). Thus, a maximum file as mentioned before corresponds to a newest file and a minimum file corresponds to an oldest file in this example.

At operation 614, defragmentation service 250 iterates, in the source table, starting from the selected next file up to the age threshold to select a second set of files for performing a second defragmentation process. In an example, each file from the second set of files is a file that is small (e.g., needs to be defragmented) based on a threshold percentage or value.

At operation 616, defragmentation service 250 sets a second indication corresponding to a particular file that is a second last file, from the second set of files, that meets the age threshold. In an example, the second last file is an oldest file from the second set of files.

At operation 618, defragmentation service 250 performs the second defragmentation process on the selected second set of files In embodiments, the second defragmentation process includes inserting the selected second set of files to a second target table. In an example, the second target table can be a different table than the source table. However, as explained before, in other examples, the second target table can be the same table as the original source table.

Figure 7:
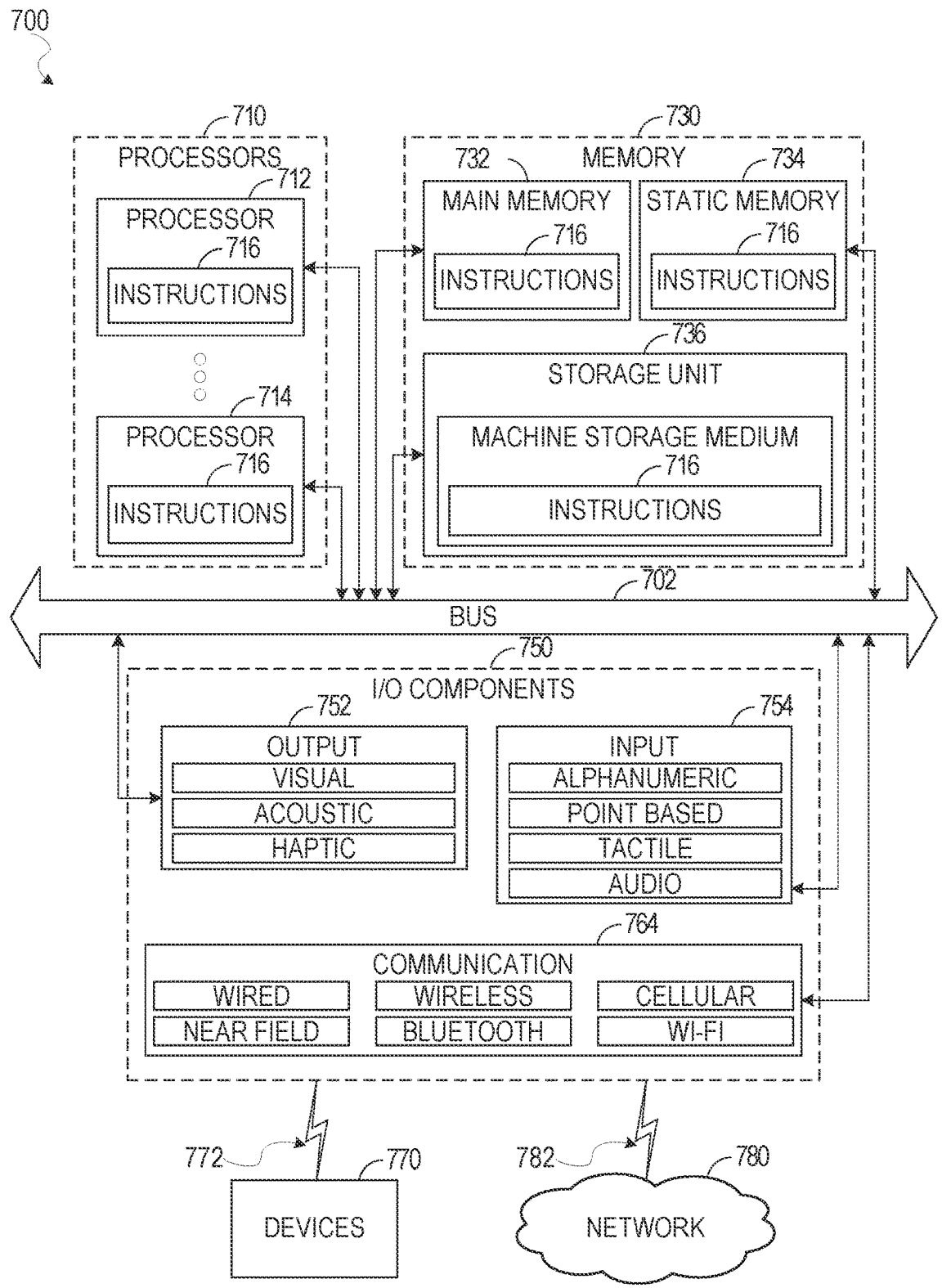
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of any one or more of the methods described above. As another example, the instructions 716 may cause the machine 700 to implement portions of the functionality illustrated in any one or more of the previously mentioned figures discussed above. In this way, the instructions 716 transform a general, non-programmed machine into a particular machine 700 (e.g., the compute service manager 108-1, the execution platform 110, and the user device 112) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service manager 108-1, the execution platform 110, and the devices 770 may include the user device 112 or any other computing device described herein as being in communication with the network-based database system 102 or the storage platform 104.

Executable Instructions and Machine Storage Medium

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 600 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The invention claimed is:

1. A network-based database system comprising:
at least one hardware processor; and
a memory storing instructions that cause the at least one hardware processor to perform operations comprising:
selecting a most recently created file from a set of files stored in a source table;
iterating, in the source table, starting from the most recently created file up to an age threshold to select a first set of files for performing a first defragmentation process, the age threshold is determined based on determining a set of peak periods for database operations and setting the age threshold to cover a particular period of time from a current time to a previous peak period from the current time, and the iterating comprising:
selecting, after selecting the most recently created file, a second file from the first set of files, the second file being older than the most recently created file;
setting an indication corresponding to a particular file that is a last file, from the first set of files, that meets the age threshold, the last file comprising an oldest file in the first set of files;
performing the first defragmentation process on the selected first set of files; and
determining that the first defragmentation process was successful.

2. The system of claim 1, wherein the operations further comprise:
selecting a next file, in the source table, from the last file; and
iterating, in the source table, starting from the selected next file up to the age threshold to select a second set of files for performing a second defragmentation process.

3. The system of claim 2, wherein the operations further comprise:
setting a second indication corresponding to a particular file that is a second last file, from the second set of files, that meets the age threshold.

4. The system of claim 3, wherein the operations further comprise:
performing the second defragmentation process on the selected second set of files.

5. The system of claim 1, wherein the age threshold comprises a period of time that files were created for including in the source table, the age threshold is determined based on a predetermined period of time prior to a current time, or the age threshold is determined based on an analysis of a number of database operations within a periodic period of time, the periodic period of time comprising a portion of an hour, different portions of an hour, an hour, several hours, a day, several days, a week, a month, or a year.

6. The system of claim 4, wherein the first defragmentation process comprises:
inserting the selected first set of files to a target table.

7. The system of claim 6, wherein performing the second defragmentation process comprises:
inserting the selected second set of files to a second target table.

8. The system of claim 6, wherein the target table is different from the source table, or the target table is a new version of the source table.

9. The system of claim 1, wherein to select the first set of files for performing the first defragmentation process comprises:
determining that a particular file is less than a file size threshold;
determining that including a size of the particular file is within a total size threshold of the selected first set of files; and
including the particular file in the selected first set of files.

10. The system of claim 9, further comprising:
determining that including the size of the particular file is greater than the total size threshold of the selected first set of files; and
including the particular file in a subsequent set of files for defragmentation.

11. A method comprising:
selecting a most recently created file from a set of files stored in a source table;
iterating, in the source table, starting from the most recently created file up to an age threshold to select a first set of files for performing a first defragmentation process, the age threshold is determined based on determining a set of peak periods for database operations and setting the age threshold to cover a particular period of time from a current time to a previous peak period from the current time, and the iterating comprising:
selecting, after selecting the most recently created file, a second file from the first set of files, the second file being older than the most recently created file;
setting an indication corresponding to a particular file that is a last file, from the first set of files, that meets the age threshold, the last file comprising an oldest file in the first set of files;
performing the first defragmentation process on the selected first set of files; and
determining that the first defragmentation process was successful.

12. The method of claim 11, further comprising:
selecting a next file, in the source table, from the last file; and
iterating, in the source table, starting from the selected next file up to the age threshold to select a second set of files for performing a second defragmentation process.

13. The method of claim 12, further comprising:
setting a second indication corresponding to a particular file that is a second last file, from the second set of files, that meets the age threshold.

14. The method of claim 13, further comprising:
performing the second defragmentation process on the selected second set of files.

15. The method of claim 11, wherein the age threshold comprises a period of time that files were created for including in the source table, the age threshold is determined based on a predetermined period of time prior to a current time, or the age threshold is determined based on an analysis of a number of database operations within a periodic period of time, the periodic period of time comprising a portion of an hour, different portions of an hour, an hour, several hours, a day, several days, a week, a month, or a year.

16. The method of claim 14, wherein the first defragmentation process comprises:
inserting the selected first set of files to a target table.

17. The method of claim 16, wherein performing the second defragmentation process comprises:

inserting the selected second set of files to a second target table.

18. The method of claim 16, wherein the target table is different from the source table, or the target table is a new version of the source table.

19. The method of claim 11, wherein to select the first set of files for performing the first defragmentation process comprises:
   determining that a particular file is less than a file size threshold;
   determining that including a size of the particular file is within a total size threshold of the selected first set of files; and
   including the particular file in the selected first set of files.

20. The method of claim 19, further comprising:
   determining that including the size of the particular file is greater than the total size threshold of the selected first set of files; and
   including the particular file in a subsequent set of files for defragmentation.

21. A non-transitory computer-storage medium comprising instructions that, when executed by one or more processors of a machine, configure the machine to perform operations comprising:
   selecting a most recently created file from a set of files stored in a source table;
   iterating, in the source table, starting from the most recently created file up to an age threshold to select a first set of files for performing a first defragmentation process, the age threshold is determined based on determining a set of peak periods for database operations and setting the age threshold to cover a particular period of time from a current time to a previous peak period from the current time, and the iterating comprising:
      selecting, after selecting the most recently created file, a second file from the first set of files, the second file being older than the most recently created file;
   setting an indication corresponding to a particular file that is a last file, from the first set of files, that meets the age threshold, the last file comprising an oldest file in the first set of files;
   performing the first defragmentation process on the selected first set of files; and
   determining that the first defragmentation process was successful.

22. The non-transitory computer-storage medium of claim 21, wherein the operations further comprise:
   selecting a next file, in the source table, from the last file; and
   iterating, in the source table, starting from the selected next file up to the age threshold to select a second set of files for performing a second defragmentation process.

23. The non-transitory computer-storage medium of claim 22, wherein the operations further comprise:
   setting a second indication corresponding to a particular file that is a second last file, from the second set of files, that meets the age threshold.

24. The non-transitory computer-storage medium of claim 23, wherein the operations further comprise:
   performing the second defragmentation process on the selected second set of files.

25. The non-transitory computer-storage medium of claim 21, wherein the age threshold comprises a period of time that files were created for including in the source table, the age threshold is determined based on a predetermined period of time prior to a current time, or the age threshold is determined based on an analysis of a number of database operations within a periodic period of time, the periodic period of time comprising a portion of an hour, different portions of an hour, an hour, several hours, a day, several days, a week, a month, or a year.

26. The non-transitory computer-storage medium of claim 24, wherein the first defragmentation process comprises:
   inserting the selected first set of files to a target table.

27. The non-transitory computer-storage medium of claim 26, wherein performing the second defragmentation process comprises:
   inserting the selected second set of files to a second target table.

28. The non-transitory computer-storage medium of claim 26, wherein the target table is different from the source table, or the target table is a new version of the source table.

29. The non-transitory computer-storage medium of claim 21, wherein to select the first set of files for performing the first defragmentation process comprises:
   determining that a particular file is less than a file size threshold;
   determining that including a size of the particular file is within a total size threshold of the selected first set of files; and
   including the particular file in the selected first set of files.

30. The non-transitory computer-storage medium of claim 29, further comprising:
   determining that including the size of the particular file is greater than the total size threshold of the selected first set of files; and
   including the particular file in a subsequent set of files for defragmentation.

* * * * *